United States Patent
Nomula

(10) Patent No.: US 12,536,009 B2
(45) Date of Patent: Jan. 27, 2026

(54) INSTALLATION SCRIPT AUTO-GENERATION TO CREATE SOURCE CODE RUNTIME ENVIRONMENT

(71) Applicant: Microsoft Technology Licensing, LLC, Redmond, WA (US)

(72) Inventor: Jagadeshwar Reddy Nomula, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 17/957,704

(22) Filed: Sep. 30, 2022

(65) Prior Publication Data
US 2023/0376296 A1   Nov. 23, 2023

Related U.S. Application Data

(60) Provisional application No. 63/344,161, filed on May 20, 2022.

(51) Int. Cl.
*G06F 9/44* (2018.01)
*G06F 8/65* (2018.01)
(Continued)

(52) U.S. Cl.
CPC ............ *G06F 8/65* (2013.01); *G06F 8/76* (2013.01); *G06F 9/45504* (2013.01)

(58) Field of Classification Search
CPC .......... G06F 8/65; G06F 8/76; G06F 9/45504; G06F 8/71; G06F 8/61; G06F 8/60;
(Continued)

(56) References Cited

U.S. PATENT DOCUMENTS 7,890,925 B1   2/2011   Wyatt et al.
8,316,349 B2   11/2012  Morozov et al.
(Continued)

FOREIGN PATENT DOCUMENTS

CN   109725912 A   5/2019
CN   110096401 A   8/2019
CN   112068852 A   12/2020

OTHER PUBLICATIONS

"2.7. Automated Installation", Retrieved from: https://web.archive.org/web/20190719093509/https:/access.redhat.com/documentation/en-us/red_hat_jboss_enterprise_application_platform/6.4/html/installation_guide/sect-automated_installation, Jul. 19, 2019, 6 Pages.
(Continued)

*Primary Examiner* — Chuck O Kendall
(74) *Attorney, Agent, or Firm* — Holzer Patel Drennan

(57) ABSTRACT

A method for auto-generating an installation script that creates a runtime environment for a source code comprises receiving a source code identifier identifying the source code; determining characteristics of a target execution runtime environment in which the source code is to be executed; extracting dependency identifiers from the source code; and providing the dependency identifiers and the characteristics of the target execution runtime environment to a trained machine learning (ML) model. The method further comprises receiving from the trained ML model library version identifiers that each identify a library supporting a corresponding one of the dependency identifiers and that is compatible with the characteristics of the target execution runtime environment. An installation script usable to create the target execution runtime environment is composed from the ML model outputs.

20 Claims, 7 Drawing Sheets

(51) Int. Cl.
*G06F 8/76* (2018.01)
*G06F 9/455* (2018.01)

(58) Field of Classification Search
CPC ...... G06F 8/658; G06F 11/3051; G06F 16/23; G06F 8/427
USPC .................................................. 717/168–178
See application file for complete search history.

(56) References Cited

U.S. PATENT DOCUMENTS

| | | | |
|---|---|---|---|
| 9,893,942 | B2 | 2/2018 | Kripalani et al. |
| 9,928,059 | B1 | 3/2018 | Sartor et al. |
| 10,254,986 | B2 | 4/2019 | Chan et al. |
| 11,262,997 | B2 | 3/2022 | Singh et al. |
| 11,620,128 | B1* | 4/2023 | Chawda ............ G06F 8/75 717/120 |
| 2009/0177686 | A1 | 7/2009 | Doeswijk |
| 2020/0285464 | A1* | 9/2020 | Brebner ............ G06F 11/362 |
| 2021/0241167 | A1* | 8/2021 | Li ..................... G06F 18/10 |
| 2021/0279066 | A1* | 9/2021 | Xiao .................. G06F 9/3891 |
| 2022/0156053 | A1* | 5/2022 | Shaastry ............ G06F 8/433 |

OTHER PUBLICATIONS

"How to Automatically Install Required Packages from a Python Script as Necessary?", Retrieved from: https://stackoverflow.com/questions/46419607/how-to-automatically-install-required-packages-from-a-python-script-as-necessary, Sep. 26, 2017, 4 Pages.

"International Search Report and Written Opinion Issued in PCT Application No. PCT/US23/016666", Mailed Date: Jul. 3, 2023, 12 Pages.

Pokorny, et al., "Customize Python Dependency Resolution with Machine Learning", Retrieved from: https://developers.redhat.com/articles/2021/11/17/customize-python-dependency-resolution-machine-learning, Nov. 17, 2021, 8 Pages.

Pokorny, Fridolin, "Resolve Python Dependencies with Thoth Dependency Monkey", Retrieved from: https://developers.redhat.com/articles/2021/09/17/resolve-python-dependencies-thoth-dependency-monkey#, Sep. 17, 2021, 7 Pages.

* cited by examiner

INSTALLATION SCRIPT AUTO-GENERATION TO CREATE SOURCE CODE RUNTIME ENVIRONMENT

CROSS-REFERENCE TO RELATED APPLICATIONS

The present application claims priority to U.S. provisional patent application No. 63/344,161 entitled "Auto-Generation of Installation Scripts to Create Runtime Environment for a Source Code," and filed on May 20, 2222, which is hereby incorporated by reference for all that it discloses or teaches.

BACKGROUND

Executing source code in a given computing environment typically entails compiling the source code along with all of its dependencies in the order that they are called by the source code. Compilation errors result when certain dependencies (e.g., libraries) are not available in the computing environment or when the dependencies are compiled in the wrong order. If, for example, function A is defined in a first library and includes function calls to functions B and C, which are defined in a second library, compilation errors may result if the second library is not compiled prior to the first library (otherwise, functions B and C are not defined at the time that function A is compiled). Adding further complication, a same library can have many different versions, with some versions being compatible with some but not all operating systems and certain coding languages and not others. For example, a first version of a library may be compatible with Java versions less than 3.0 while another version of the same library is needed to support Java scripting in versions greater than 3.0.

For the above reasons, it can be time-consuming to create an execution runtime environment where source code can run without error.

SUMMARY

According to one implementation, a disclosed method provides for receiving source code; determining characteristics of a target execution runtime environment in which the source code is to be executed; extracting dependency identifiers from the source code; and providing the extracted dependency identifiers and the determined characteristics of the computing environment to a trained machine learning (ML) model of an installation script generation engine, the installation script generation engine being configured to utilize semantic associations learned by the ML model to auto-generate an installation script for the source code that defines dependencies of the source code and that is usable to create the target execution runtime environment for the source code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
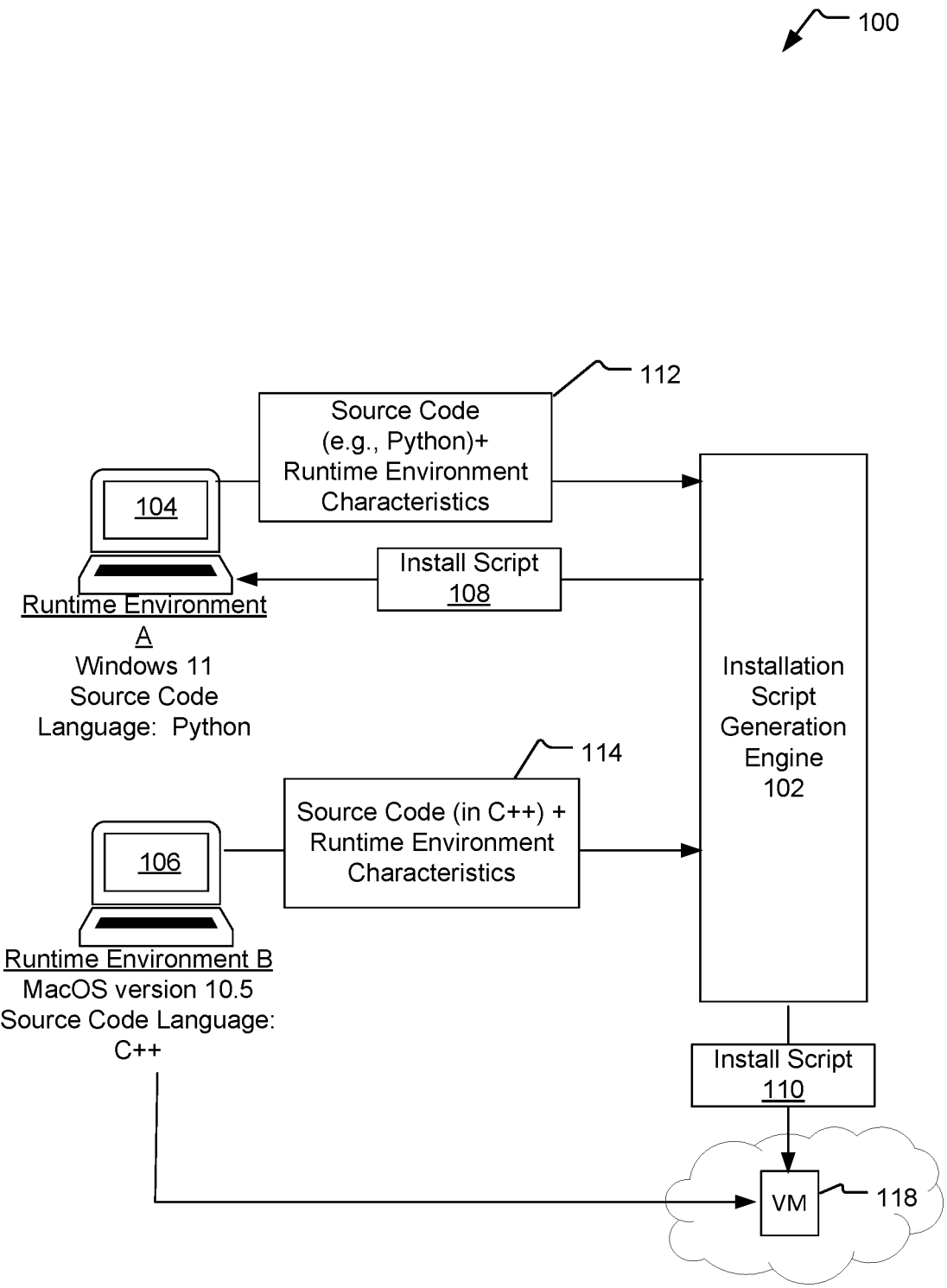
FIG. 1 illustrates an example system that includes an installation script generation engine that auto-generates an installation script usable to create an execution runtime environment for a source code product.

To execute source code, a developer performs various actions to create an execution runtime environment, which is a computing environment in which all dependencies of a source code are installed such that the source code can then be compiled without compilation errors. For example, an execution runtime environment may be a local directory in which the source code can be executed, where the directory stores the source code along with a copy of all dependences of the source code. Alternatively, the execution runtime environment may be a virtual machine (VM) configured on a cloud-based server.

One common way to create a runtime environment for source code is to generate an installation script (e.g., a config file) that stores information about the libraries, modules, and packages used while developing the source code. The installation script may be provided to an application that installs the dependencies defined in the installation script to generate the execution runtime environment. For example, the Unix operating system accepts an installation file entitled "requirements.txt" as an input to an install command that is executable to create a runtime environment for a particular source code. Likewise, other platforms may utilize various application(s) execute a developer-provided installation script that creates a runtime environment. The installation script may, in various implementations, be a text file (as in the requirements.txt example above) or an executable file that can be executed to create the execution runtime environment for the associated source code.

Creating an installation script can be a time-consuming and error-prone process. This process entails, for example, identifying certain characteristics of the computing environment where the source code is to be executed (e.g., the operating system and hardware of the machine providing the runtime environment), identifying libraries called by the source code and all of their dependencies, identifying a correct version for each dependency (e.g., library) that that is compatible with the identified characteristics of the target runtime environment, and also defining the dependencies in the installation file correctly with reference to the correct version numbers and in a correct order to ensure that compilation errors do not occur. Traditionally, a developer has to manually determine all of the above information and resolve dependency compatibility issues as well as ordering issues, such by trial and error, consulting online forums, etc.

According to one implementation, the disclosed technology provides an installation script generation engine that uses a trained machine learning model, such as deep learning network, to automatically generate an installation script for a source code when provided with the source code and specified characteristics of a target runtime environment. The auto-generated install script can then be used to create the target runtime environment—either automatically by a service provider that configures the runtime environment or by a developer that executes the script. The target runtime environment is, for example, a container on the local machine or instead a virtual machine on a local host or on the cloud where the source code can be compiled without error.

FIG. 1 illustrates an example system 100 that includes an installation script generation engine 102 that auto-generates an installation script for a source code. The installation script generation engine 102 is configured to receive certain inputs from a user machine and, in response, to utilize a trained neural network to auto-generate and test an installation script usable to generate the execution runtime environment for the source code file. In one implementation, the installation script generation engine 102 is a cloud-based service hosted by a third-party service provider. In another implementation, some or all aspects of the installation script generation engine 102 are stored on and/or executed locally on a user machine, such as on one of user devices 104 and 106.

In one implementation, a code developer interacts with the installation script generation engine 102 through a user interface (e.g., a web-based interface) to provide the installation script generation engine 102 with inputs associated with a source code product. FIG. 1 illustrates two different examples of this type of interaction with respect to user device 104 and 106.

In the simplified example of FIG. 1, it is assumed that the user device 104 is a device that is to be used to run the source code. Responsive to receipt of a set of inputs from the user device 104 the installation script generation engine 102 creates a corresponding installation script 108, transmits the installation script back to the user device 104, and a developer performs actions on the received installation script to locally create the desired execution runtime environment for the source code. In another implementation, the installation script generation engine 102 creates the installation script 108, configures a virtual machine with certain developer-specified execution runtime characteristics, and creates the execution runtime environment on the virtual machine using the installation script. In this implementation, the developer may be granted access to execution runtime environment on the virtual machine where the source code can be executed.

To initiate generation of an installation script for a source code product, a developer provides the installation script generation engine 102 with certain inputs 112, 114 through a user interface (e.g., a web interface) that is accessed from a user device 104 or 106. The inputs 112, 114 includes at least the source code or, if the source code is publicly available, an identifier for the source code, as well as certain runtime environment characteristics of the target computing environment where the source code is to be executed. The specified runtime environment characteristics may include, for example, existing libraries and their versions installed on the device, the version of the operating system executing on the device, hardware characteristics of the device, such as memory and processor resources including available cache sizes (L1/L2 cache size), processor type (e.g., 32 bit v. 64 bit, multi-core v. single core, GPU v. CPU, RISC processor v. CISC processor), availability of the display device size of L1 and L2 caches on the device, availability of the Display Device, etc. In some implementations, the runtime environment characteristics included in the inputs 112, 114 further include an installation script that the developer has created for the source code, such as a script that did not execute successfully. Such a script may, for example, include includes libraries called by the source code and corresponding version numbers.

In the illustrated example, the user device 104 executes the Windows® 11 operating system. Notably, the Windows® 11 operating system includes a number of supported libraries that may or may not be already installed on the user device 104. In some cases, the user device 104 may store different versions of individual libraries and/or be configured to retrieve other (e.g., newer) versions of the currently-installed libraries or other libraries not yet installed, such as from a web-based repository.

The inputs 112 provided to the installation script generation engine 102 by the user device 104 include a source code file, which may be written in a variety of different languages, as well as a set of runtime environment characteristics of the target computing environment where the source code is to be executed. For example, the set of runtime environment characteristics may include the operating system and various hardware parameters of the user device 104. Upon receiving the inputs 112, the installation script generation engine 102 determines the coding language of the source code (e.g., Python) and parses the source code to extract certain dependency information (e.g., "Import [library]" statements or the equivalent given the selected coding language). With this information, the installation script generation engine 102 identifies a full set of corresponding dependencies for the source code, identified by version numbers that support the applicable coding language (Python®) and that are compatible with the operating system (Windows® 11) and also compatible with the various specified hardware characteristics of the user device 104.

The installation script generation engine 102 generates an installation script 108, tests the installation script 108 (e.g., as described with respect to FIG. 2) and—in the illustrated implementation—returns the installation script to the user device 104.

In the same or another implementation shown with respect to the user device 106, the installation script generation engine 102 generates another installation script 110, configures a container on a virtual machine 118 with a set of received runtime environment characteristics (e.g., included in inputs 114), and executes the installation script 110 in the container to create the execution runtime environment for the source code product on the configured virtual machine 118. For example, the inputs 114 from the user device 106 include a source code product and indicate that the target runtime environment executes MacOS® version 10.5. The installation script generation engine 102 parses the source code to determine an applicable coding language (e.g., C++®) and to extract dependency information from the source code. This dependency information, together with the other received or determined target runtime environment characteristics (e.g., operating system, hardware specifications, and determined coding language), are used by the installation script generation engine 102 to (1) identify a full set of corresponding dependency identifiers including appropriate version numbers compatible with the target runtime characteristics and also to (2) identify an appropriate compilation order for the dependencies such that the dependances can be compiled without error. Based on the identified dependencies and dependency order, the installation script generation engine 102 generates the installation script 110 and uses the installation script 110 to configure a cloud-based runtime environment on the virtual machine 118.

In one implementation, the installation script generation engine 102 attempts to generate a runtime environment via a trial-and-error method that provides for configuring multiple different possible runtime environments, each used to attempt a compilation of the source, so as to generate a cloud-based runtime environment for the user as quickly as possible. For example, multiple different runtime environments may be generated in the container on the virtual machine 118 or in a parallel manner on different containers and/or different virtual machines. Once the runtime environment is successfully created, the user that initiated the request may be given access to the execution runtime environment (e.g., on the virtual machine 118) to execute the source code product.

In one implementation, the installation script generation engine 102 includes a machine learning model, which may be a neural network, trained on a data set including source code products in a variety of languages, their associated installation scripts, and characteristics of the runtime environment in which each of the installation scripts were successfully used to compile the corresponding source code. An example of such a system is shown and described with respect to FIG. 2.

Figure 2:
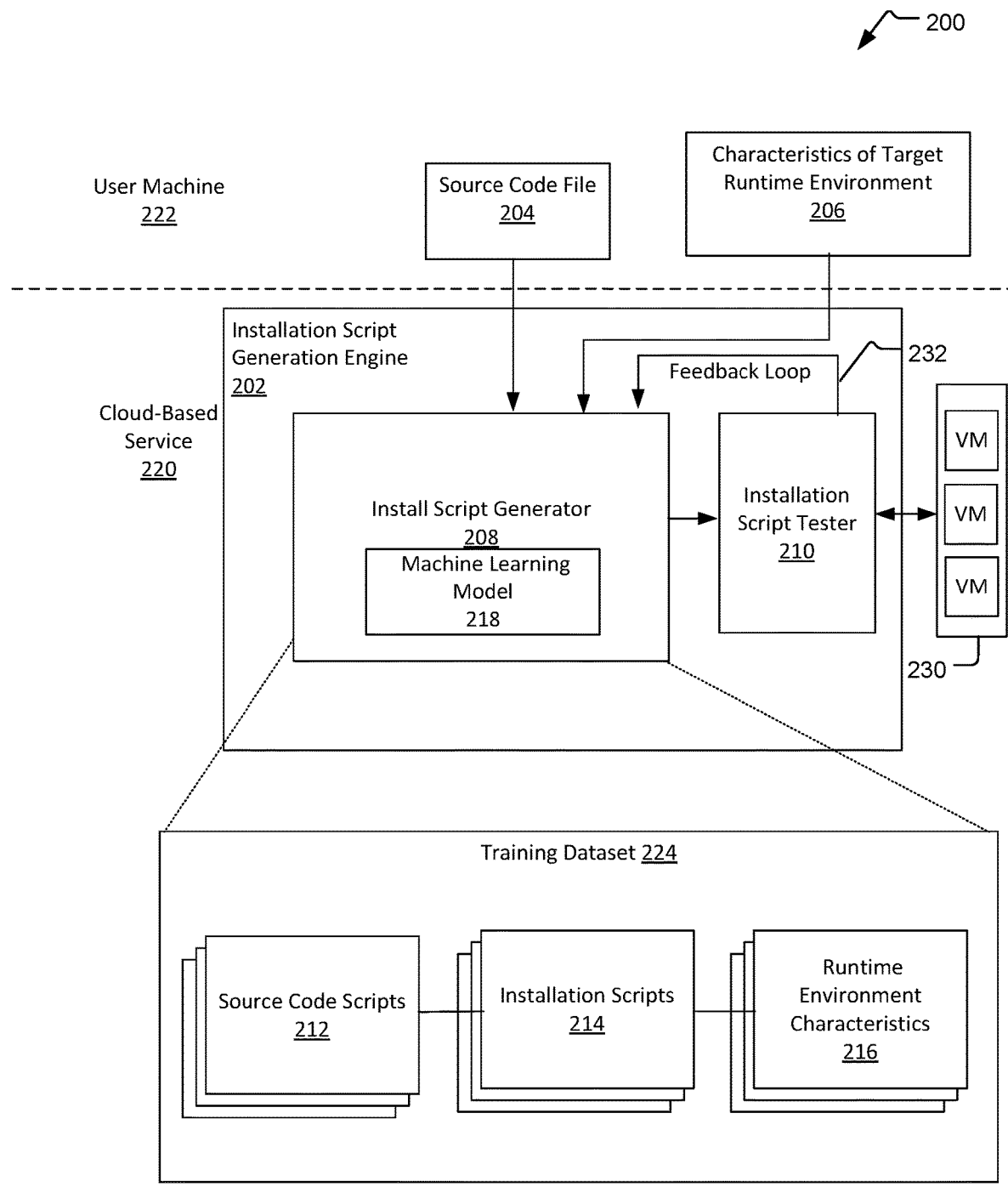
FIG. 2 illustrates an example system for auto-generating installation scripts for source code products using a trained neural network.

FIG. 2 illustrates an example system 200 for auto-generating installation scripts for source code products using a trained neural network. The system 200 includes an installation script generation engine 202 that is part of a cloud-based service 220 used by developers to create execution runtime environments for their various source code products.

The installation script generation engine 202 includes an install script generator 208 and an installation script tester 210. The install script generator 208 includes a trained machine learning model 218 that executes logic based on learned semantic associations from a corpus of textual information included in a training dataset 224.

In different implementations that utilize different types of machine learning models, the training dataset 224 may include a variety of different types of information. In FIG. 2, the training dataset 224 includes source code scripts 212, installation scripts 214, and characteristics of runtime environments 216. For example, a single training input includes three types of information: (1) a source code product; (2) an installation script successfully executed to create a runtime environment for the source code product without compilation errors; and (3) various characteristics of the successfully-created execution runtime environment (e.g., O.S. and device hardware characteristics of the device hosting the environment). In other implementations, the training dataset 224 may include other information as well such as developer comments (e.g., regarding what did/did not work in various different attempts at creating the execution runtime environment as well as compilation errors that may have been observed in those prior attempts).

The full set of training inputs in the training dataset 224 may include a corpus of source code scripts spanning a rich variety of coding languages, the corresponding (successful) installation scripts, and the hardware and software characteristics of the runtime environments where the installation scripts were successfully run.

Throughout training of the machine learning model 218, the install script generator 208 learns semantic associations between dependencies referenced in different source code files (e.g., function calls), library identifiers (e.g., library version numbers) and various runtime characteristics of the environments where the source code products were successfully compiled given the corresponding library identifiers.

When provided with a source code file 204 and set of characteristics for a target runtime environment 206, the trained machine learning model 218 uses the learned semantic associations to identify a corresponding set of library identifiers (version numbers) ordered in a manner that is conducive to error-free dependency compilation and creation of the corresponding execution runtime environment. These library identifiers are then recorded in an installation script per the identified ordering scheme, and an installation script tester 210 that tests the installation script.

In one implementation, the installation script tester 210 tests an installation script by first configuring a container on a virtual machine (VM) (e.g., one of multiple virtual machines 230) with the characteristics of the target runtime environment 206 determined based on inputs from a user machine 222. The installation script tester 210 then attempts to run the installation script in the virtual machine container. If the attempt is successful, the execution runtime environment has been created and the source code can be compiled in that runtime environment without error.

The trained machine learning model 218 may, in different implementations, be trained using supervised, unsupervised, or a combination of supervised and unsupervised learning techniques. In one implementation, the trained machine learning model 218 includes a reinforcement learning model. For example, the reinforcement learning model may initially be trained using supervised learning and refined, over time, in an unsupervised fashion based on feedback from the installation script tester 210 (e.g., feedback pertaining to whether or not the installation script could be successfully executed to create the execution runtime environment for the source code). In one such implementation, the reinforcement learning algorithm can use previous compilation output and/or comments from developers (e.g., as the reinforcement state), a successful compilation (e.g., as the reinforcement learning reward), and generate installation sequences as the reinforcement learning action that is performed based on the state. The model can be trained using policy or value-based approaches.

If testing of the installation script results in one or more compilation errors, the installation script tester 210 provides the error(s) back to the install script generator 208 via a feedback loop 232, and the trained machine learning model 218 modifies the known semantic associations based on the feedback, outputting a modified installation script that can then be similarly tested by the installation script tester 210. In still other implementations, the install script generator 208 outputs multiple different versions of the installation script, and the installation script tester 210 tests the different versions on different virtual machines that are each configured with the characteristics of the target runtime environment 206.

In one implementation, the trained machine learning model 218 includes one or more deep learning models. For example, the trained machine learning model 218 may include a transformer model, such as a transformer model with characteristics discussed below with respect to FIG. 3. In still another implementation, the trained machine learning model 218 includes a neural network that is initially generated by a transformer model and then referenced via transfer learning, such as in the manner discussed below with respect to FIG. 4.

Figure 3:
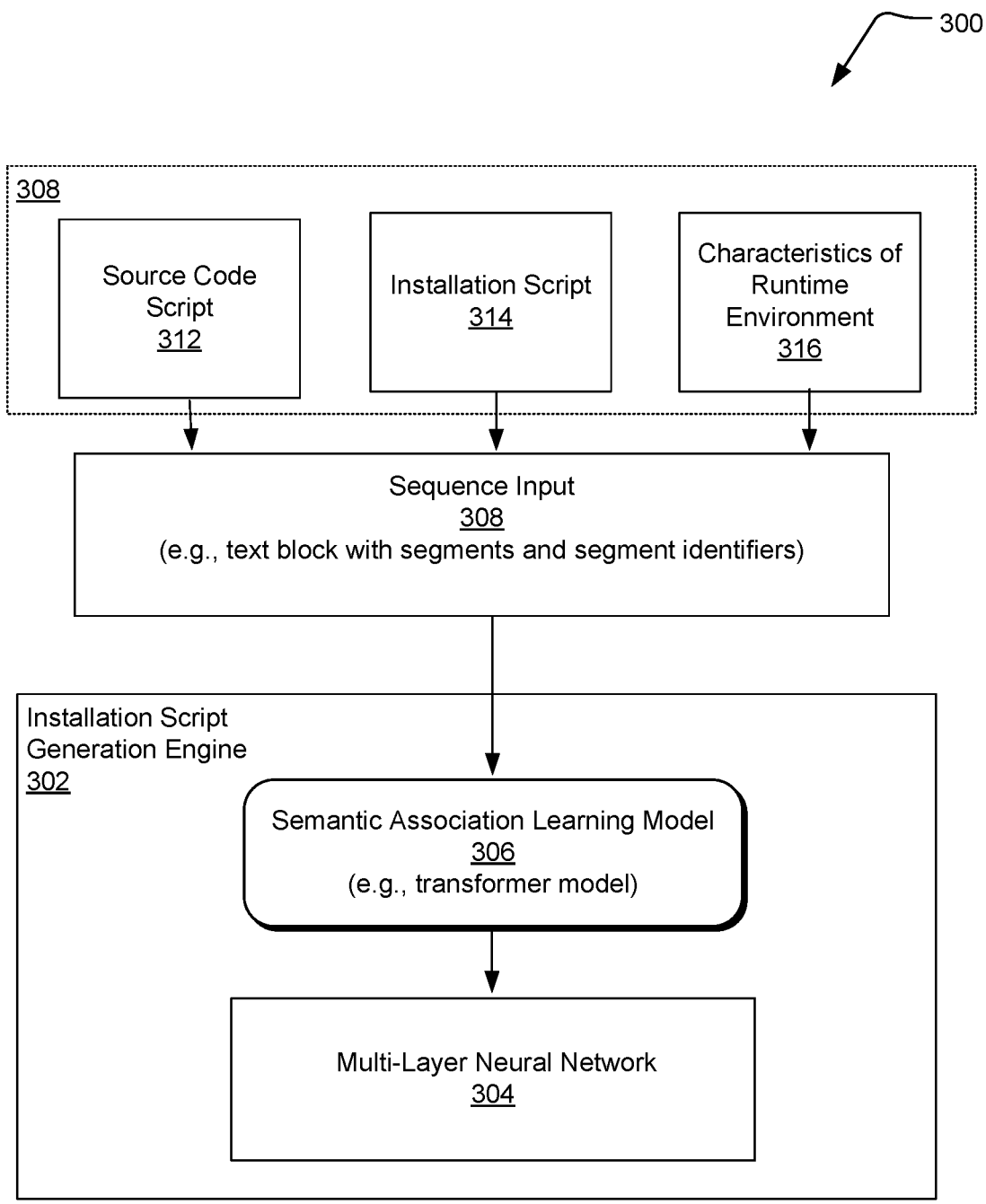
FIG. 3 illustrates aspects of a training process for creating a multi-layer neural network that may be used in an installation script generation engine that auto-generates installation scripts for source code products.

FIG. 3 illustrates aspects of a training process 300 that is used to create a multi-layer neural network 304 that may be included in an installation script generation engine 302 that that auto-generates installation scripts for source code products. The multi-layer neural network 304 may be understood as being included with an installation script generation engine 302 that has characteristics the same or similar to the installation script generation engines discussed above with respect to FIG. 1-2.

The multi-layer neural network 304 is created by training a semantic association learning model 306 with sets of input data including information such as that shown with respect to sequence input 308. In one implementation, the semantic association learning model 306 is a model trained to transform a given sequence of elements into another, such as by translating the sequence of words in an English sentence into a French sentence. The semantic association learning model 306 is, for example, a sequence-to-sequence (Seq2Seq) model or a transformer model, such as BERT (Bidirectional Encoder Representations from Transformers). These models can be pretrained on very large datasets in an unsupervised manner for language modeling.

In one implementation, the semantic association learning model 306 accepts as input a sequence input 308. The sequence input 308 represents a single training input that is based on at least three types of information—(1) a source code script 212; (2) an installation script 214 (e.g., a script that was successful at creating the runtime environment for the source code script); and (3) characteristics of a runtime environment where the installation script 214 was successfully executed, such as the operating system and hardware characteristics of the host device. In one implementation, the sequence input 308 is a large block of text that includes the source code script 312 followed by the installation script 314 followed by the corresponding characteristics of the runtime environment 316. Different segments (e.g., types of information) in the sequence input 308 may be separated by tokens, such as SEP and CLS tokens, that are used to help the installation script generation engine 302 understand the end of one input and the start of another in the same sequence input 308.

The installation script generation engine 302 receives the sequence input 308 and may generate certain embeddings from the received information. For example, the BERT model accepts as input three embeddings that may be generated from the sequence input 308. These three embeddings each have a number of dimensions corresponding to the number of words in the sequence input 308 and include (1) a token embedding with each index representing a corresponding word from the sequence input 308 of matching index; (2) a segment embedding with each index including a segment number (e.g., sentence number in the block of input sentences) that the corresponding word at the index is included within; and (3) a position embedding with each index representing a position of the corresponding word at the index within its associated segment of the sequence input 308.

As opposed to directional models that read text inputs sequentially, transformer models such as BERT read the entire sequence of words at once and is for that reason said to be "bidirectional." This characteristics allows the model to learn the context of a word based on all of its surroundings.

Training the semantic association learning model 306 on a large corpus of source code files and their corresponding installation scripts and runtime characteristics yields a multi-layer neural network 304 that serves as the logical core of the installation script generation engine 302. The multi-layer neural network 304 is essentially a logical network with many layers and nodes embedding an understanding of how each different semantic element in the corpus of training inputs information relates to every other element.

Training data for training the semantic association learning model 306 may be gathered by employing crowdsourcing techniques and/or by cleaning up public source code available in online sources such as GitHub®, or other suitable methods. To better generalize the trained multi-layer neural network 404, the training data may include source code from multiple programming languages and for different operating systems.

In one implementation, a transfer learning model is used to refine the top few layers of the multi-layer neural network 304 to provide more accurate next segment prediction for individual customer. An example of such as system is discussed in further detail with respect to FIG. 4.

Figure 4:
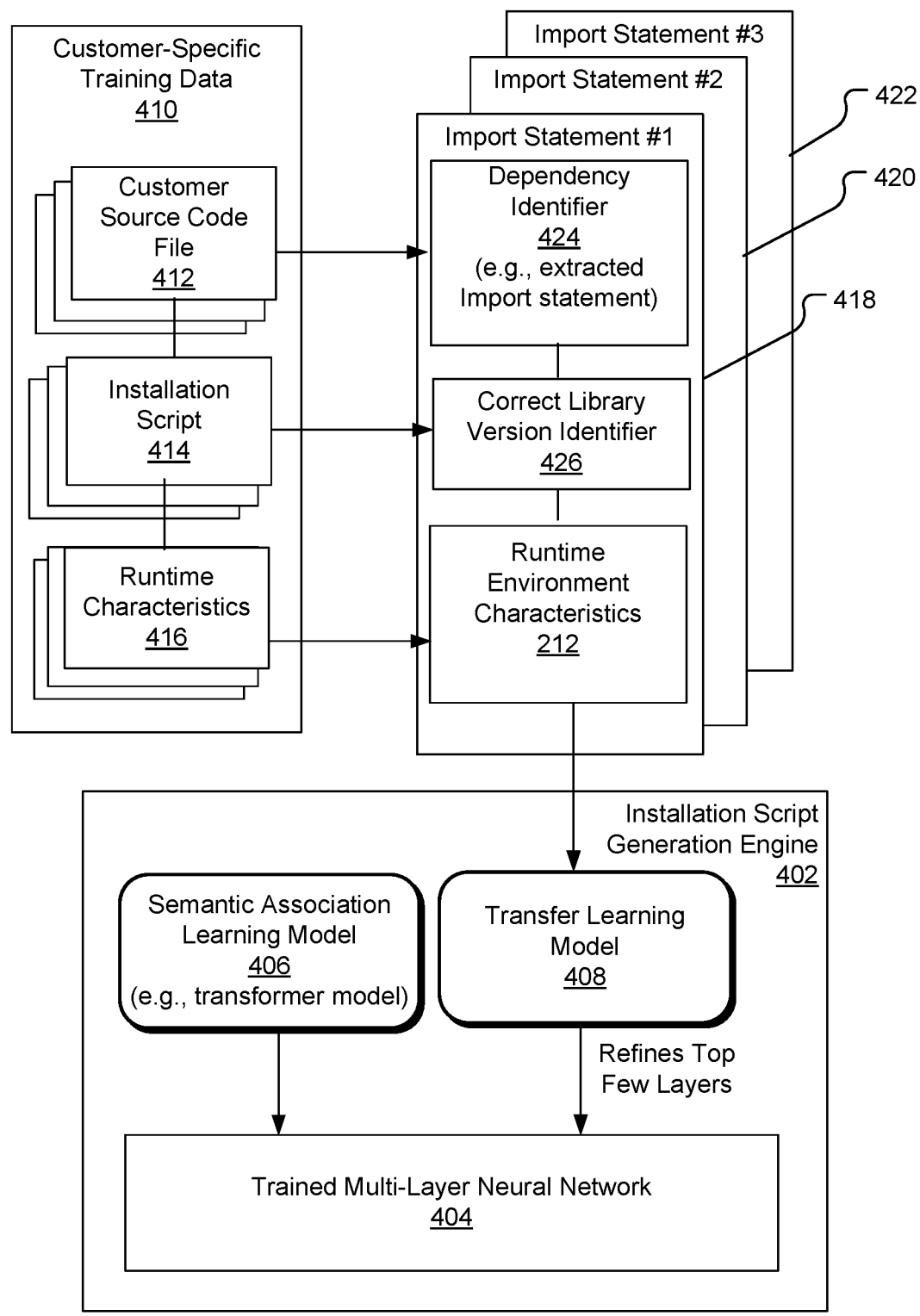
FIG. 4 illustrates example operations for refining a trained multi-layer neural network improve accuracy of associations between source code dependencies and corresponding library version identifiers.

FIG. 4 illustrates example operations 400 for refining a trained multi-layer neural network 404, such as the multi-layer neural network 304 of FIG. 3, to improve accuracy of associations between source code dependencies and supporting library version identifiers. The trained multi-layer neural network 404 is shown within an installation script generation engine 402, which may be understood as having characteristics the same or similar to installation script generation engines described with respect to other figures herein. The installation script generation engine 402 includes multiple models that are used, in combination, to create the trained multi-layer neural network 404.

Although the trained multi-layer neural network 404 may, in different implementations, be generated using many different types of known supervised learning and unsupervised learning techniques, the operations 400 provide for first training a generalized semantic association learning model 406 and for then refining the top few layers of the trained multi-layer neural network 404 using a transfer learning model 408.

The initial training of the semantic association learning model 406 may be performed in a manner the same or similar to that described above with respect to the semantic association learning model 306 of FIG. 3. This results in a rich network of learned semantic associations spanning many programming languages and computing environments. Following this, the transfer learning model 408 refines the trained multi-layer neural network 404 with an additional set of "refinement" training inputs. In one implementation, these refinement training inputs are specific to an individual customer. For example, the refined training inputs may include a large body of source code files scripted by the customer and corresponding successfully-executed installation scripts along with corresponding execution runtime characteristics. Since the customer may frequently code in the same language(s) and/or frequently re-use certain libraries and certain hardware configurations, this type of customer-specific re-training can significantly improve the quality of predictive associations that are generated by the trained multi-layer neural network 404 with respect to inputs associated with that same customer.

Transfer learning models employ supervised learning to transfer knowledge from one supervised learning task to another. In the illustrated implementation, transfer learning is used to teach the trained multi-layer neural network a set of "correct" associations for an individual customer. For example, a "correct" association may be an association between an individual "Import [library]" in a customer-provided source code file and a library version identifier that is compatible with the customer's target runtime characteristics such that the import statement can be executed to compile the corresponding library in the customer-specified runtime environment without error. This concept is illustrated by customer-specific training data 410.

The customer-specific training data 410 includes multiple sets of training inputs provided by a single individual customer (e.g., a corporate entity that generates many software products). Each individual customer-provided input within the customer-provided input set includes a customer source code file 412, an installation script 414 that was used to successfully create the runtime environment for the customer source code file 412, and a set of runtime characteristics 416 pertaining to the machine and/or software configuration that supported the runtime environment (e.g., the operating system, processor type).

Inputs to the transfer learning model 408 are more granular than customer-provided inputs described above and also with respect to FIG. 3 and the semantic association learning model 306). Rather than accept the entire source code file and corresponding installation script as a training input, the transfer learning model 408 accepts a dependency-specific sentence block including information relating to a single source code product dependency.

According to one implementation, preprocessing of each set of training inputs in the customer-specific training data 410 includes extracting dependency identifiers from the customer source code file 412 and, for each extracted dependency identifier, extracting a corresponding library version identifier from the associated installation script 414. By example, the Python coding language uses "import [library]" statements in source code products to identify and import each library needed to support one or more functions referenced in the corresponding source code body. Therefore, an "Import [library]" statement is one example of a dependency identifier 424. Other examples include the names of subroutines called from the customer source code file 412.

From this, the dependency-specific training inputs 418, 420, 422 can be generated, where each dependency-specific training input includes one of extracted dependency identifier (e.g., a dependency identifier 424), a corresponding correct library version identifier (e.g., library version identifier 426), and the runtime environment characteristics 428 associated with the previous successful creation of the execution runtime environment for the customer source code file 412.

In one implementation, the transfer learning model 408 receives a set of training inputs for the source code file 412, where each training input in the set is in the form [sentence 1], [sentence 2]. For example, sentence 1 includes the extracted import statement 242 together with the characteristics of runtime environments 216 (e.g., as one long text string) and sentence 2 denotes the corresponding correct library version identifier extracted from the installation script 414. For example, the input is of a format similar to: [Import Pandas, runtime characteristics], [Pandas 1.2], where "Pandas" is a library called by the source code file, "Pandas 1.2" is a correct version identifier for the library, and "runtime characteristics" is a string of text indicating characteristics of the execution runtime environment (e.g., operating system and compute hardware) where the Pandas library was successfully compiled using library version 1.2.

These training inputs may be transformed into sets of input embeddings as required by the particular transfer learning model employed. In one embodiment, One Hot Encoded embeddings are used to represent the import statements when training the transfer learning model. Using the above-described training techniques, a dictionary can be generated for mapping each import package to library with a correct version identifier for the customer's runtime environment characteristics.

Notably, the neural network training approach described with respect to FIGS. 3 and 4 (e.g., the use of unsupervised training with a generalized transformer model followed-by customer-specific tuning achieved by supervised training with a transfer learning model) represents one of many different suitable approaches for creating the underlying logical network utilized by the installation script generation engine 402 to auto-generate source code installation scripts. Other suitable approaches will be readily apparent to those of skill in the art.

Figure 5:
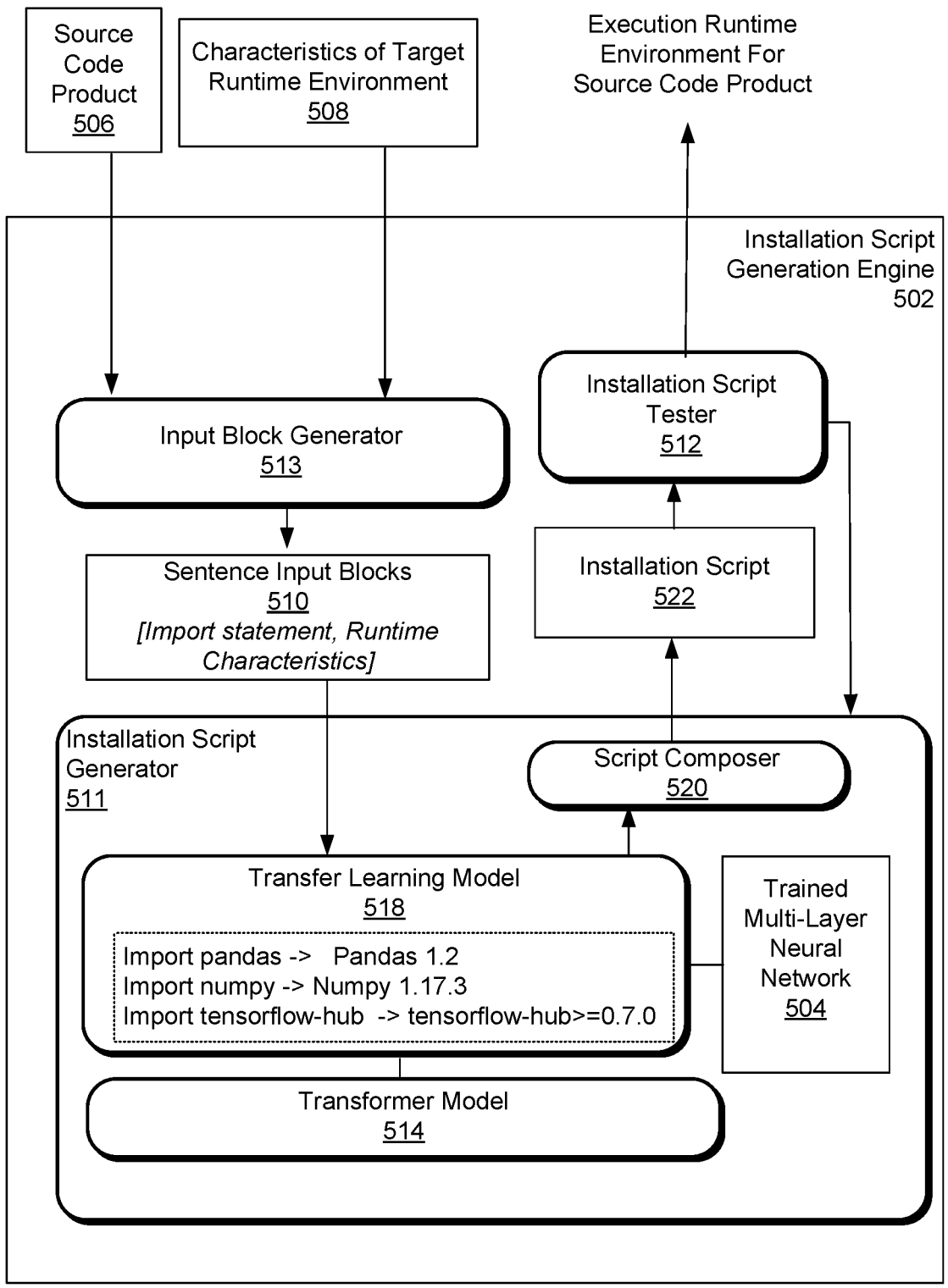
FIG. 5 illustrates an example installation script generation engine that auto-generates installation scripts for source code products.

Example functionality of the installation script generation engine 402 is discussed with respect to FIG. 5.

Specifically, FIG. 5 illustrates an example installation script generation engine 502 that auto-generates installation scripts for source code products. In some implementations, the installation script generation engine 502 also uses each auto-generated installation script to configure an execution runtime environment on a virtual machine for use by a developer when executing a source code product.

The installation script generation engine 502 includes an input block generator 513, an install script generator 511, and an installation script tester 512. The input block generator 513 receives inputs from a developer pertaining to creation of an execution runtime environment for a particular source code product. In one implementation, the developer provides the installation script generation engine 502 with the source code product 506 through a web-based interface along with certain specified characteristics of a target runtime environment 508 (e.g., operating system and hardware characteristics of the machine that is to execute the source code product 506). In some implementations, one or more characteristics of the target runtime environment 508 are passively retrieved (e.g., without developer input) by the input block generator 513 from the developer's computing device.

The input block generator 513 parses the source code product 506 and extracts dependency identifiers (e.g., "Import [Library]" statements). For each different extracted dependency identifier, the input block generator 513 creates a sentence input block 510 that is to be provided as an input to a transfer learning model 518. An example one of the sentence input blocks 510 is a text string including a single one of the extracted import statements followed by one or more of the characteristics of the target runtime environment 508.

The install script generator 511 can include a transfer learning model 518 that is capable of translating each of the received sentence input blocks 510 for the source code product 506 to an associated library version identifier that is compatible with the characteristics of the target runtime environment 508. For example, the transfer learning model 518 may receive three sentence input blocks 510, each relating to a different import statement (e.g., Import pandas; Import numpy; Import tensorflow-hub) extracted from the source code product 506 For each input block statement, the transfer learning model maps the import statement to a corresponding library version identifier (e.g., "Pandas 1.2, Numpty 1.17.3, Tensorflow-hub>=0.7.0). This mapping by the transfer learning model 518 is performed using logical semantic associations of a trained multi-layer neural network 504.

The trained multi-layer neural network 504 that that is created through one or more machine learning training processes, such as the example processes described with respect to FIG. 3 and FIG. 4. Although different types of models may be used to initially create the trained multi-layer neural network 504, the illustrated implementation uses a transformer model 514 to learn a general corpus of information pertaining to source code products, libraries, languages, and runtime characteristics. The top few layers of this network are then refined, such as by training a transformer model 514 to modify the trained multi-layer neural network based on learned associations from a customer-specific training dataset, such as in the manner discussed with respect to FIG. 4.

After the transfer learning model 518 identifies the library version identifiers associated with each "Import" statement extracted from the source code, logic may be employed to identify a proper ordering of the library version identifiers in the resulting installation script 522 such that the installation script 522 can be compiled without error. In one implementation, the installation script generator 511 includes a first trained ML model to identify the dependencies needed to compile the source code (as described above), and a second of ML model (not shown) to determine the ordering of the dependencies. For example, the second model may be trained on inputs including various source code scripts and characteristics of execution runtime environments where the source code scripts were successfully compiled. Given as input the determined set of dependencies for the source code product and the characteristics of the target runtime environment 508, the second model can reference the body of training data to determine a proper order of the dependencies.

Using outputs of the transfer learning model 518 and the determined order of the dependency identifiers, a script composer 520 composes an installation script 522 for the source code product. The generated installation script 522 is tested by the installation script tester 512. In one implementation, the script composer 520 generates multiple different versions of the installation script 522 that are tested in parallel on different virtual machines by the installation script tester 512. Reinforcement learning may be used to refine associations in the trained multi-layer neural network 504 based on feedback from the installation script tester 512 regarding configurations that did or did not succeed in creating the target execution runtime environment for the source code product 506.

In some implementations, the install script generator 511 includes a rule-based model that runs on top of or in parallel with a trained machine learning model (e.g., the transfer learning model 518). For example, a rule-based model may apply static rules based on various developer inputs regarding configurations that did or did not succeed for specified runtime environments. Testing of existing rule-based models indicates that such models may succeed in a large number of cases (e.g., 60% success rate). For this reason, there may exist some instances where the installation script 522 can be more quickly generated using a rule-based model, falling back on the trained machine learning model in the instances for which the rule-based model fails.

Once the installation script tester 512 determines that the installation script 522 works (e.g., the script can be executed without compilation error to create the source code runtime environment on a machine configured with the characteristics of the target runtime environment 508), the operations of the installation script generation engine 502 are complete. The installation script 522 may be returned to a developer to execute locally or, instead, the developer may be provided with access to the source code runtime environment that has been created by the installation script tester 512 for the source code product 506. For example, the developer may be provided with access to a container on a virtual machine configured with the characteristics of the target runtime environment 508 where the installation script has been successfully executed to install the dependencies of the source code product 506.

Figure 6:
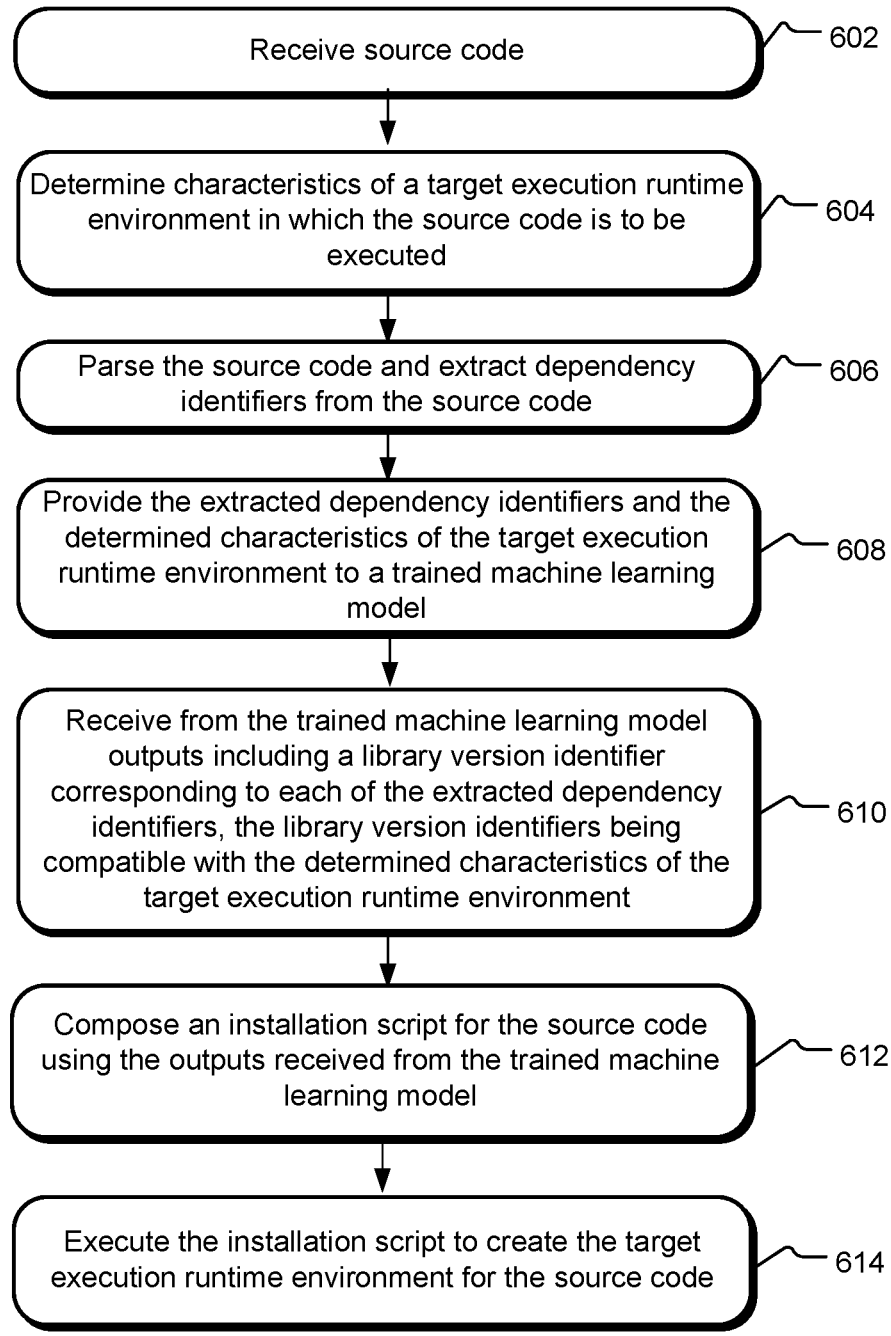
FIG. 6 illustrates example operations for auto-generating an installation script to create an execution runtime environment for a source code product.

FIG. 6 illustrates example operations 600 for auto-generating an installation script to create an execution runtime environment for a source code product. A receiving operation 602 receives source code, such as from a user device or a public repository based on a source code identifier that a developer provides (e.g., through a web interface).

A determining operation 604 determines characteristics of a target runtime environment in which the source code is to be executed. The determining operation 604 may include receiving one or more of the characteristics through a web-portal (e.g., developer-provided inputs). For example, a developer may specify one or more characteristics of a target execution runtime environment in which the source code is to be run. In another implementation, the determining operations 604 includes retrieving one or more of the characteristics from the user device (e.g., querying the device to identify the device's operating system, processor type, and/or other hardware characteristics). A parsing and extracting operation 606 parses the source code and extracts dependency identifiers from the source code. A dependency identifier is, for example, an "import [library]" statement, the name of a subroutine called by the source code.

A providing operation 608 provides the extracted dependency identifiers and the determined characteristics of the target execution runtime environment to a trained machine learning model. In one implementation, the machine learning model is included within an installation script generation engine that is configured to utilize semantic associations learned by the ML model to auto-generate an installation script for the source code.

A receiving operation 610 receives, from the trained ML model, outputs including a library version identifier corresponding to each of the extracted dependency identifiers, the library version identifier being compatible with the determined characteristics of the target execution runtime environment. For example, the dependency identifier may be a library called "numpy" and the corresponding library version identifier is numpy 3.0, which is compatible with an operating system and processor type included in the determined characteristics of the target execution runtime environment.

A composition operation 612 composes an installation script for the source code that includes the outputs generated by the trained machine learning model. In one implementation, the machine learning model performs the composition operation 612. In other implementation, a complementary module performs the composition operation 612 based on several rounds of inputs provided to and outputs received from the machine learning model.

An execution operation 614 executes the auto-generated installation script to create the target execution runtime environment for the source code. In one implementation, the execution operation 614 is performed during testing of the installation script. For example, the installation script may be tested in a container on a virtual machine that is configured with the determined characteristics of the target execution runtime environment. A developer may be provided with access to the container following successful execution of the installation script. In another implementation, the developer is provided with the auto-generated installation script and the developer performs actions to locally install the dependencies listed in the installation script in the scripted order.

Figure 7:
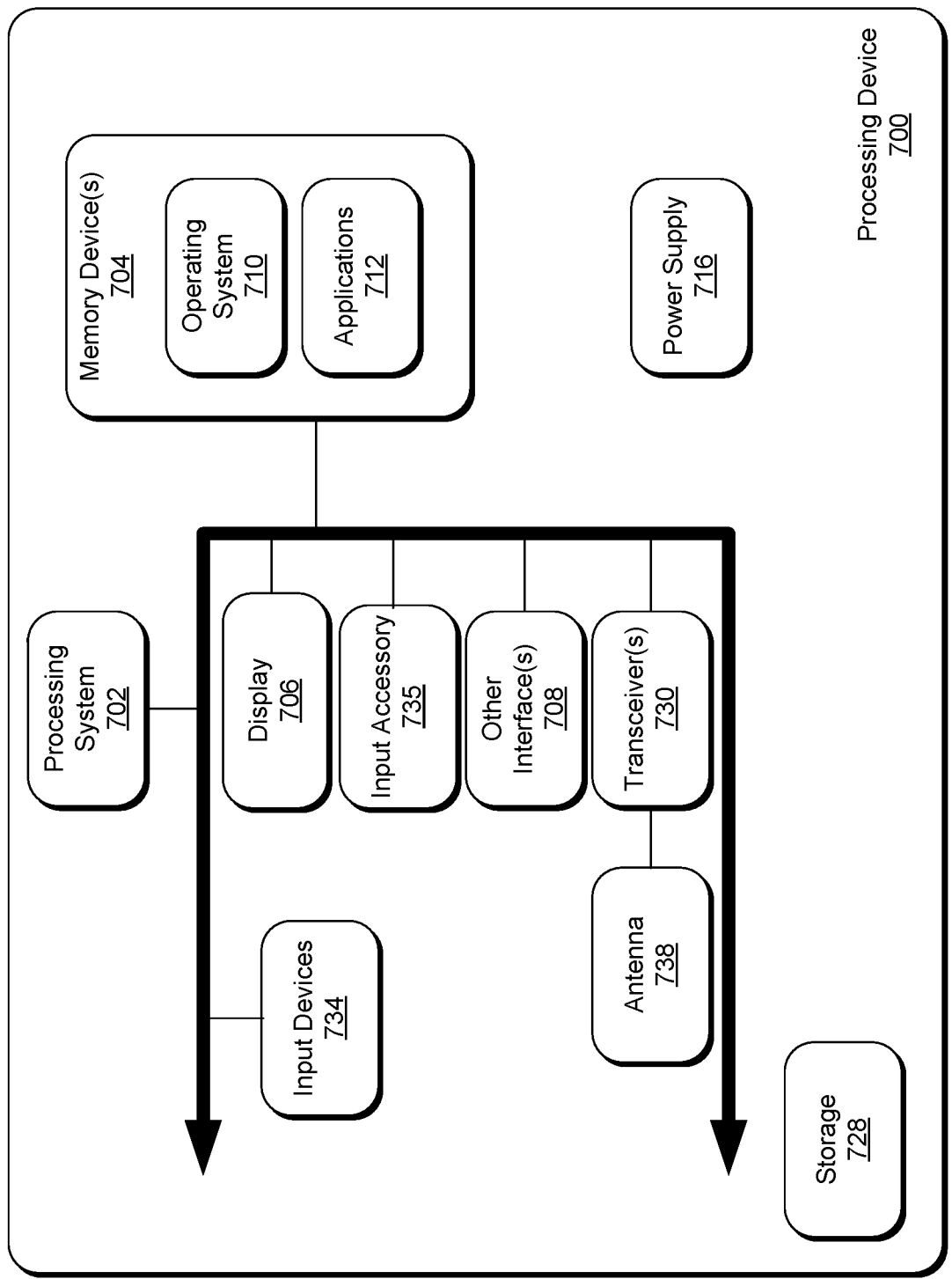
FIG. 7 illustrates an example schematic of a processing device suitable for implementing aspects of the disclosed technology.

FIG. 7 illustrates an example schematic of a processing device 700 suitable for implementing aspects of the disclosed technology. In one implementation, the processing device 700 is a server that executes an installation script generation engine (e.g., installation script generation engine 102 of FIG. 1) to auto-generate an installation script (e.g., a requirements.txt file) that is usable to create the execution runtime environment for a given source code product.

The processing device 700 includes a processing system 702, memory device(s) 704, the display 706, and other interfaces 708 (e.g., buttons). The memory device(s) 704 generally includes both volatile memory (e.g., random access memory (RAM) and non-volatile memory (e.g., flash memory). An operating system 710 may reside in the memory device(s) 704 and be executed by the processing system 702. One or more applications 712, such as an installation script generation engine 102 or its submodules (e.g., as described with respect to FIG. 5) may be loaded in the memory and executed on the operating system 710 by the processing system 702.

The processing device 700 includes a power supply 716, which is powered by one or more batteries or other power sources and which provides power to other components of the processing device 700. The power supply 716 may also be connected to an external power source that overrides or recharges the built-in batteries or other power sources.

Additionally, the processing device 700 includes one or more communication transceivers 730 and an antenna 732 to provide network connectivity (e.g., a mobile phone network, Wi-Fi®, BlueTooth®). The processing device 700 may be further coupled to various input devices 734 such as a microphone, keyboard, touch display, etc. In an implementation, an installation script generation engine, along with other various applications and other modules and services, are embodied by instructions stored in memory device(s) 704 and/or storage devices 728 and processed by the processing system 702. The memory device(s) 704 may be memory of host device or of an accessory that couples to a host. The installation script generation engine may include a trained multi-layer neural network that is saved in the memory device(s) 704 or saved in memory of one or more other compute devices (e.g., various interconnected processing nodes) that are communicatively coupled to the processing device 700, such as via the internet.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes random-access memory (RAM), read-only memory (ROM), electrically erasable read-only memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other tangible medium which can be used to store the desired information and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium include one or more types of computer-readable storage media capable of storing electronic data, including volatile memory or non-volatile memory, removable or non-removable memory, erasable or non-erasable memory, writeable or re-writeable memory, and so forth. Examples of the logic include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture stores executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein. According to a first aspect, some implementations provide for a method for auto-generating an installation script that creates a runtime environment for a source code. The method includes receiving a source code identifier identifying the source code; determining characteristics of a target execution runtime environment for the source code; extracting dependency identifiers from the source code; providing the dependency identifiers and the characteristics of the target execution runtime environment to a trained machine learning (ML) model; receiving, from the trained ML model, library version identifiers that each identify a library supporting a corresponding one of the dependency identifiers and that is compatible with the characteristics of the target execution runtime environment; and composing an installation script that includes the library version identifiers, the installation script being usable to create the target execution runtime environment for the source code.

The above method of A1 is advantageous because it eliminates the time-consuming trial-and-error process that developers currently undertake when generating source code installation scripts.

(A2) In some implementations of A1, the installation script is an executable file that generates the target execution runtime environment. (A3) In other implementations of A1, the installation script is a text file input to an installation function that uses the installation script to create the target execution runtime environment.

(A4) In still other implementations of A1-A3, the characteristics of the target execution runtime environment are characteristics of a user machine and the method further comprises providing the installation script to the user machine. The method of A4 is advantageous because it allows the user to receive a ready-made installation script tailored for the user's machine that can be locally executed without error.

(A5) In other implementations of A1-A4, the method further comprises configuring a container on a virtual machine with the characteristics of the target execution runtime environment; creating the execution runtime environment for the source code in the container on the virtual machine using the installation script; and responsive to successful creation of the execution runtime environment in the container on the virtual machine, providing a user device with access to the container. The method of A5 is advantageous because it provides for auto-generation of a runtime environment on a virtual machine that the user can access to run the source code without performing an affirmative action to execute the installation script.

(A6) In still other implementations of A1-A5, determining the characteristics of a target execution runtime environment includes detecting the characteristics of the target execution environment from a user device. (A7) in other implementations of A1-A76 the method further comprises generating multiple different versions of the installation script; configuring multiple virtual machines with the characteristics of the target execution runtime environment; and testing each of the different versions of the installation script in parallel on the configured multiple virtual machines. The method of A7 is advantageous because it may provide for expedited generation of the target runtime environment as compared to implementations that create and test installation scripts in series (e.g., re-creating and re-testing when the installation script fails to produce the target runtime environment).

(A8) In other implementations of A1-A7, the installation script specifies an order of dependencies identified by the dependency identifiers, the order facilitating error-free compilation of the dependencies.

(A9) In still other implementations of A1-A8, the trained ML model includes at least one of a transformer model and a transfer learning model.

In another aspect, some implementations include a computing system for auto-generating an installation script that creates a runtime environment for a source code. The computing system includes hardware logic circuitry that is configured to perform any of the methods described herein (e.g., methods A1-A9).

In yet another aspect, some implementations include a computer-readable storage medium for storing computer-readable instructions. The computer-readable instructions, when executed by one or more hardware processors, perform any of the methods described herein (e.g., methods A1-A9).

The above specification, examples, and data provide a complete description of the structure and use of example implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for auto-generating an installation script that creates a runtime environment for a source code, the method comprising:
   receiving a source code identifier identifying the source code;
   determining characteristics of a target execution runtime environment for the source code;
   extracting dependency identifiers from the source code;
   providing the dependency identifiers and the characteristics of the target execution runtime environment to a trained machine learning (ML) model, the trained ML model being trained to identify sets of library version identifiers for an input source code that are compatible with different target execution runtime environments;
   receiving, from the trained ML model, library version identifiers that each identify a version of a library supporting a corresponding one of the dependency identifiers and that is compatible with the characteristics of the target execution runtime environment; and
   composing the installation script that includes the library version identifiers, the installation script being usable to create the target execution runtime environment for the source code.

2. The method of claim 1, wherein the installation script is an executable file that generates the target execution runtime environment.

3. The method of claim 1, wherein the installation script is a text file input to an installation function that uses the installation script to create the target execution runtime environment.

4. The method of claim 1, wherein the characteristics of the target execution runtime environment are characteristics of a user machine and the method further comprises:
   providing the installation script to the user machine.

5. The method of claim 1, wherein the method further comprises:
   configuring a container on a virtual machine with the characteristics of the target execution runtime environment;
   creating the execution runtime environment for the source code in the container on the virtual machine using the installation script; and
   responsive to successful creation of the execution runtime environment in the container on the virtual machine, providing a user device with access to the container.

6. The method of claim 1, wherein determining the characteristics of the target execution runtime environment includes detecting the characteristics of the target execution environment from a user device.

7. The method of claim 1, further comprising:
   generating multiple different versions of the installation script;
   configuring multiple virtual machines with the characteristics of the target execution runtime environment;

testing each of the different versions of the installation script in parallel on the configured multiple virtual machines.

8. The method of claim 1, wherein the installation script specifies an order of dependencies identified by the dependency identifiers, the order facilitating error-free compilation of the dependencies.

9. The method of claim 1, wherein the trained ML model includes at least one of a transformer model and a transfer learning model.

10. A system auto-generating an installation script that creates a runtime environment for a source code, the system comprising:
 a processing system;
 memory;
 an installation script generation engine stored in the memory and executable by the processing system to:
  receive, from a device, a source code identifier identifying a source code;
  receive, from the device, characteristics of a target execution runtime environment for the source code;
  extract dependency identifiers from the source code;
  provide the dependency identifiers and the characteristics of the target execution runtime environment to a trained machine learning (ML) model, the trained ML model being trained to identify sets of library version identifiers for an input source code that are compatible with different target execution runtime environments;
  receive, from the trained ML model, library version identifiers that each identify a version of a library supporting a corresponding one of the dependency identifiers and that is compatible with the characteristics of the target execution runtime environment; and
  compose the installation script that includes the library version identifiers, the installation script being usable to create the target execution runtime environment for the source code.

11. The system of claim 10, wherein the characteristics of the target execution runtime environment include detected characteristics of the device.

12. The system of claim 10, wherein the characteristics of the target execution runtime environment are characteristics of the device and the installation script generation engine is further configured to:
 provide as output the installation script to the device.

13. The system of claim 10, wherein the characteristics of the target execution runtime environment are user-specified characteristics and the installation script generation engine is further executable to:
 configure a container on a virtual machine with the characteristics of the target execution runtime environment;
 use the installation script to create the execution runtime environment for the source code in the container on the virtual machine; and
 responsive to successful creation of the execution runtime environment in the container on the virtual machine, provide the device with access to the container.

14. The system of claim 10, wherein installation script generation engine is further executable to:
 generate multiple different versions of the installation script;
 configure multiple virtual machines with the characteristics of the target execution runtime environment;
 test each of the different versions of the installation script in parallel on the configured multiple virtual machines; and
 responsive to a successful test of a particular version of the installation script on a virtual machine, provide access to a runtime execution environment created on the virtual machine by the successful test.

15. The system of claim 10, wherein the installation script specifies an order of dependencies identified by the dependency identifiers, the order facilitating error-free compilation of the dependencies.

16. The system of claim 10, wherein the trained ML model includes at least one of a transformer model and a transfer learning model.

17. A method comprising:
 training a machine learning (ML) model with a set of training inputs including source code products and, for each one of the source code products:
  a corresponding installation script successfully used to create a runtime environment for the source code product; and
  characteristics of a computing environment in which the runtime environment was successfully created by the installation script;
 extracting dependency information from a source code file;
 providing as input to the ML model the dependency information along with a set of characteristics of a target execution runtime environment, the trained ML model being trained to identify sets of library version identifiers for an input source code that are compatible with different target execution runtime environments; and
 receiving as output from the ML model a set of library version identifiers, each one of the library version identifies identifying a version of a library that supports a dependency in the source code product and that is compatible with the characteristics of the target runtime environment; and
 composing the installation script that includes the set of library version identifiers.

18. The method of claim 17, wherein the outputs from the ML model provide an ordering for the library version identifiers that supports error-free compilation of a set of corresponding libraries.

19. The method of claim 17, wherein the installation script is at least one of an executable file that generates the target execution runtime environment and a text file input to an installation function that uses the installation script to create the target execution runtime environment.

20. The method of claim 17, further comprising:
 using the installation script to create a runtime environment for the source code on a virtual machine; and
 providing access to the runtime environment on the virtual machine.

* * * * *